(12) United States Patent
Yoo et al.

(10) Patent No.: US 6,913,635 B2
(45) Date of Patent: Jul. 5, 2005

(54) DUST COLLECTING FILTER OF VACUUM CLEANER AND VACUUM CLEANER HAVING THE SAME

(75) Inventors: Dong-Hun Yoo, Gwangju (KR); Hyun-Ju Lee, Jeonrabuk-Do (KR)

(73) Assignee: Samsung Gwangju Electronics Co. LTD, Gwangju (KR)

( * ) Notice: Subject to any disclaimer, the term of this patent is extended or adjusted under 35 U.S.C. 154(b) by 152 days.

(21) Appl. No.: 10/405,730

(22) Filed: Apr. 2, 2003

(65) Prior Publication Data

US 2004/0098957 A1 May 27, 2004

(30) Foreign Application Priority Data

Nov. 22, 2002 (KR) .................................. 10-2002-0072967

(51) Int. Cl.[7] .............................................. B01D 35/30
(52) U.S. Cl. .............................. 55/476; 55/482; 55/486; 55/498; 55/503; 55/DIG. 3
(58) Field of Search .......................... 55/476, 482, 486, 55/498, 503, DIG. 3

(56) References Cited

U.S. PATENT DOCUMENTS

| | | | |
|---|---|---|---|
| 3,425,192 A | 2/1969 | Davis ........................ | 55/345 |
| 4,593,429 A | 6/1986 | Dyson ........................ | 15/353 |
| 6,026,540 A | 2/2000 | Wright et al. | |
| 6,289,553 B1 | 9/2001 | Dyson ........................ | 15/347 |
| 6,341,404 B1 | 1/2002 | Salo et al. | |
| 6,712,868 B2 * | 3/2004 | Murphy et al. ............. | 55/330 |

FOREIGN PATENT DOCUMENTS

| | | |
|---|---|---|
| GB | 1340955 | 12/1973 |
| GB | 2280388 | 1/1995 |
| JP | 10-234630 | 8/1998 |
| WO | 0040135 | 7/2000 |
| WO | 0105291 | 1/2001 |
| WO | WO 02/078506 A1 | 3/2002 |

OTHER PUBLICATIONS

Search and Examination Report (issue date May 21, 2003) from the British Patent Office with respect to British Patent Application No. 0305297.4.
Dutch Search Report based on dutch application No. 1023636 filed on Jun. 11, 2003 Russian Official Action ussued Jul. 20, 2004 based on Russian Patnet Application No. 2003110018 filed on Apr. 8, 2003.

* cited by examiner

*Primary Examiner*—Robert A. Hopkins
(74) *Attorney, Agent, or Firm*—Ohlandt, Greeley, Ruggiero & Perle LLP

(57) ABSTRACT

Disclosed is a dust-collecting filter of a vacuum cleaner which can be reused after emptying and washing off the contaminant filled inside the filter. A dust collecting filter comprises a first case member with an air inlet hole connected through with an air inlet port of the dust collecting chamber, a second case member with a plurality of air discharge holes formed on the side for forming paths for discharging air flown in through the air inlet hole, the second case member connected with the first case member to form predetermined space in between the first case member and the second case member, and a contaminant separating means disposed on air discharge path of the predetermined space for separating and collecting contaminants from air passing the air discharge path and being discharged through the air discharge hole. The first case forms a cylinder and has a plurality of groove portions on the side, and the second case forms a cylinder and has a plurality of resilient plates with hooks for hooking on the groove portions whereby the first case member and the second case member are selectively separatable.

14 Claims, 4 Drawing Sheets

DUST COLLECTING FILTER OF VACUUM CLEANER AND VACUUM CLEANER HAVING THE SAME

BACKGROUND OF THE INVENTION

1. Field of the Invention

The present invention relates to a filter of a vacuum cleaner, and more particularly to a dust collecting filter which can be reused by emptying and washing off the contaminants filled inside and a vacuum cleaner having the same.

2. Description of the Prior Art

A general conventional vacuum cleaner has the structure in which dusts and all kinds of foreign substances (hereinafter, called "contaminants") are sucked in from a surface to be cleaned together with air by using the suction force generated on a suction port by a vacuum generating apparatus, and the contaminants entrained in the sucked air is separated by a filter.

The above mentioned filter generally uses a paper filter (paper bag). The paper filter is an expendable which is separated from the vacuum cleaner and disposed together with the contaminants filled inside when the filter is full. Such disposable paper filter is one of the main factors for increasing the maintenance costs of a vacuum cleaner. In addition, such paper filter is unhygienic as it provides environment suitable for harmful bacteria to inhabit and propagate and requires cumbersome replacement of filters.

SUMMARY OF THE INVENTION

An object of the invention is to solve at least the above problems and/or disadvantages and to provide at least the advantages described hereinafter.

Accordingly, one object of the present invention is to solve the foregoing problems by providing a dust collecting filter of a vacuum cleaner which is reusable by emptying and washing off the contaminants filled inside.

Another object of the present invention is to provide a dust collecting filter of a vacuum cleaner which is hygienic by preventing inhabitation of bacteria, and easy to mount and dismount into/off a dust collecting chamber.

Another object of the invention is to provide a vacuum cleaner that can reduce maintenance costs and is easy to use by comprising a dust collecting filter having above-stated features.

The foregoing and other objects and advantages are realized by providing a dust collecting filter of a vacuum cleaner, which can be reused after emptying and washing off the contaminant filled inside the filter, comprising a first case member with an air inlet hole connected through with an air inlet port of the dust collecting chamber, a second case member with a plurality of air discharge holes formed on the side for forming paths for discharging air flown in through the air inlet hole, the second case member connected with the first case member to form predetermined space in between the first case member and the second case member, and a contaminant separating means disposed on air discharge path of the predetermined space for separating and collecting contaminants from air passing the air discharge path and being discharged through the air discharge hole.

According to the present invention, a reusable filter can reduce the cost incurring due to the replacement of a conventional disposable paper filter and is hygienic as inhabitation of bacteria can be prevented and easy to mount and dismount thereby improving the convenience of the vacuum cleaner.

According to the present invention, the first case forms a cylinder and has a plurality of groove portions on the side, and the second case forms a cylinder and has a plurality of resilient plates with hooks for hooking on the groove portions whereby the first case member and the second case member are selectively separatable.

The dust separating means comprises a first contaminant separating member initially separating large contaminants and a second contaminant separating member secondarily separating fine contaminants not separated by the first contaminant separating member.

The first contaminant separating member forms a grill with a cylindrical body having an opening portion connected through with the air inlet hole of the first case member and a plurality of passages connected through with the air discharge hole of the second case member on the outer circumference of a cylindrical body, and the second contaminant separating means forms a fine dust filter of a sponge material located on the outer circumference of the grill.

The first contaminant separating member is integrally formed with the second case member and forms a grill with a frame having a front open portion connected through with the air inlet hole of the first case member, a plurality of side open portions connected through with the air discharge hole of the second case member, and nets disposed on the side open portions, and the second contaminant separating member is a fine dust filter of a non-woven fabric material located on outer circumference of the grill.

Meanwhile, in order to achieve another object of the present invention the vacuum cleaner comprises a vacuum cleaner body having a dust collecting chamber with an air inlet port connected with a suction brush and an air discharge port, a vacuum generating apparatus disposed in a driving chamber spaced at the rear side of the dust collecting chamber of the vacuum cleaner body to be connected through with the dust collecting chamber via the air discharge port for reducing pressure in the dust collecting chamber, and a dust collecting filter, which is reusable, disposed in the dust collecting chamber for separating and collecting contaminants entrained in air drawn into the dust colleting chamber.

The dust collecting filter comprises a first case member with an air inlet hole formed to be connected through with an air inlet port of the dust collecting chamber, a second case member connected with the first case member to form predetermined space in between the first and second case member and has a plurality of air discharge holes on the side to form a path for air flown in through the air inlet hole, and a contaminant separating means disposed in the air path in the predetermined space for separating and collecting contaminants from air being discharged through the plurality of air discharge holes.

BRIEF DESCRIPTION OF THE DRAWINGS

The above object and the feature of the present invention will be more apparent by describing a preferred embodiment of the present invention with reference to the accompanying drawings, in which.

DETAILED DESCRIPTION OF THE PREFERRED EMBODIMENT

Hereinafter, a dust collecting filter of a vacuum cleaner according to a preferred embodiment of the present invention will be described in greater detail with reference to the accompanying drawings.

Figure 1:
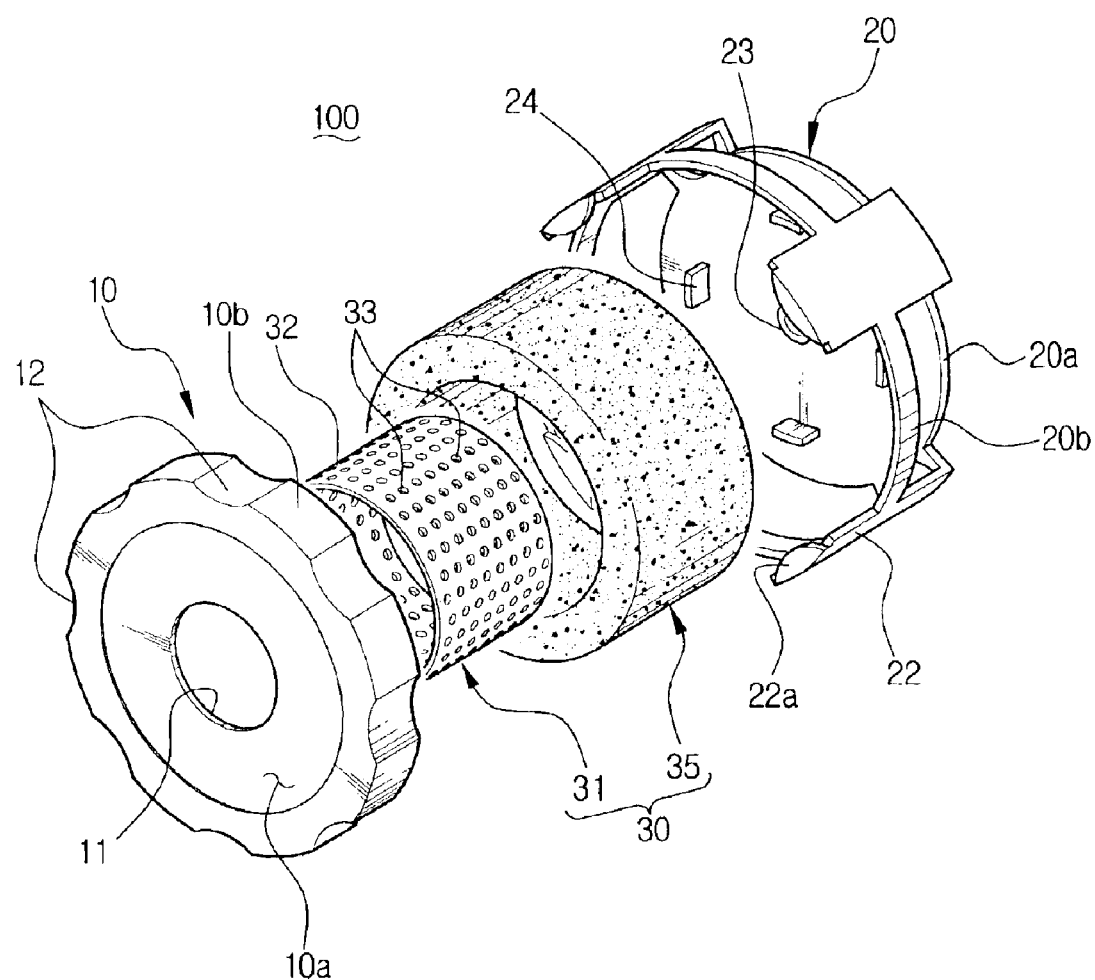
FIG. 1 is an exploded perspective view showing a dust collecting filter of a vacuum cleaner according to an embodiment of the present invention.
Figure 2:
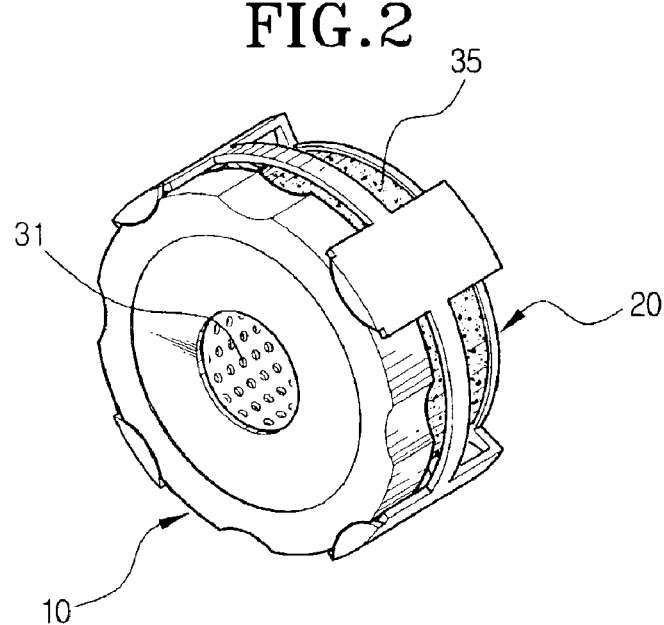
FIG. 2 is a perspective view showing the dust collecting filter of FIG. 1 being assembled.
Figure 3:
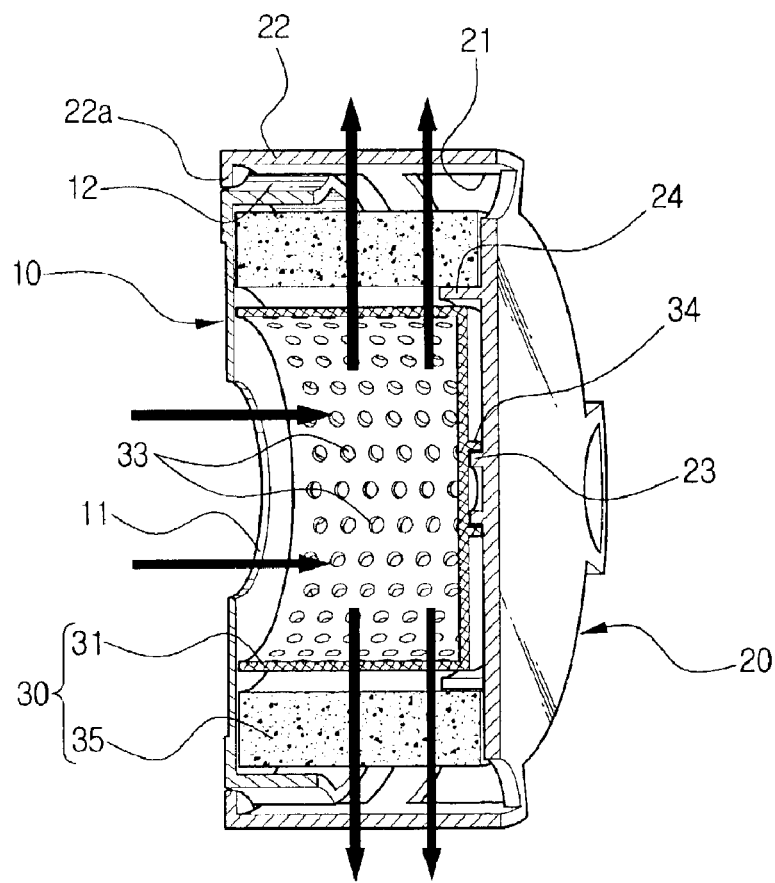
FIG. 3 is a sectional view showing inner structure of the half cut dust collecting filter and a contaminant separating process according to an embodiment of the present invention shown in FIG. 2.

As shown in FIGS. 1 through 3, the dust collecting filter of a vacuum cleaner comprises a first case member 10, a second case member 20, and a contaminant separating means 30. The dust collecting filter according to such present invention is reusable after emptying and washing off the collected contaminants by separating the first and second case members 10, 20 when the filter is full. Hereinafter, the structure of the dust collecting filter is described in detail.

Figure 5:
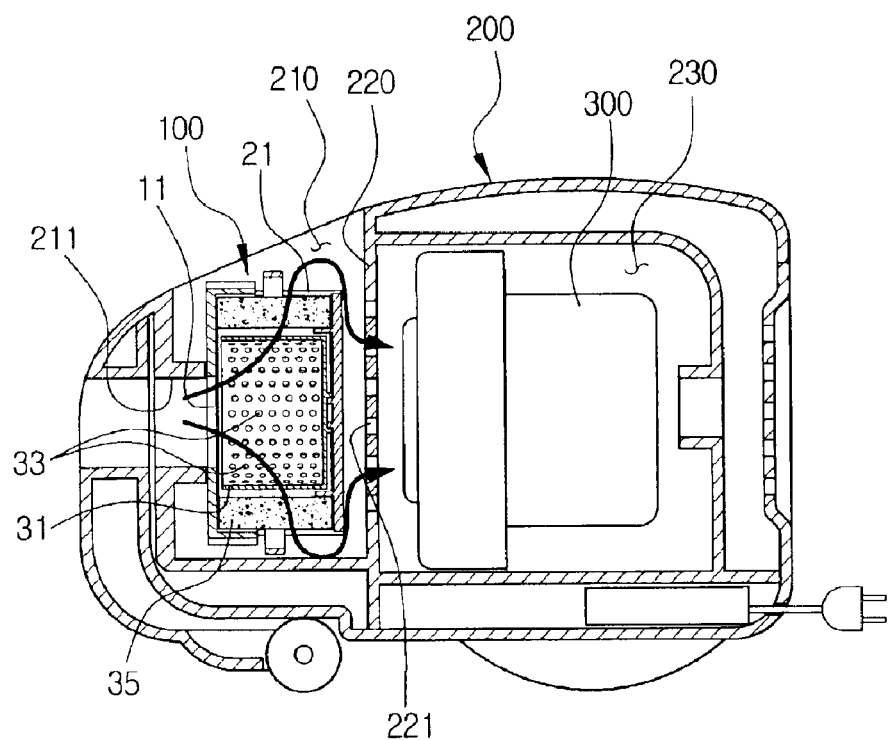
FIG. 5 is a sectional view showing a dust collecting filter of a vacuum cleaner according to the present invention being mounted in a dust collecting chamber.

The first case member 10 forms a cylinder with a front surface 10a and a side surface 10b. The front surface 10a has an air inlet hole 11 in the middle and the side surface 10b has a multiplicity of groove portions 12. As shown in FIG. 5, the air inlet hole 11 is connected with an air inlet port 211 formed on the dust collecting chamber 210 when the dust collecting filter 100 is mounted in the dust collecting chamber 210 of a vacuum cleaner body 200. Accordingly, when a vacuum generator 300 disposed in a driving chamber 230 spaced by a partition 220 at the rear side of the dust collecting chamber 210 is driven, the air including contaminants is sucked into the dust collecting filter 100 through a suction brush (not shown) and the air inlet hole 11. In FIG. 5, reference numeral 221 is an air discharge port of the dust collecting chamber 210, and the air discharge port 221 connects the dust collecting chamber 210 and the driving chamber 230.

The second case member 20 connected with the first case member 10 to form a predetermined space in between the first and the second members 10, 20 forms a cylinder having a rear surface 20a and a side surface 20b. The side surface 20b has a multiplicity of air discharge holes 21 to form air discharge paths for air flown in through the air inlet hole 11. In addition, the side surface 20b has a multiplicity of resilient plates 22 having hooks 22a at predetermined intervals for hooking on the groove portions 12 of the first case member 10. The rear surface 20a has a positioning protrusion 23 in the middle and a multiplicity of supporting ribs 24 around the positioning protrusion 23 at predetermined intervals. The positioning protrusion 23 and the supporting ribs 24 will be described later.

The contaminants separating means 30 is disposed on the air discharge paths of the predetermined space formed inside when the first and second case members 10, 20 are connected, and separates and collects contaminants from the air passing the air discharge paths and being discharged through the plurality of air discharge holes 21. Such contaminant separating means 30 comprises a first contaminant separating means 31 for initially separating large contaminants and a second contaminant separating means 35 for secondarily separating minor contaminants not separated by the first contaminant separating means 31.

The first contaminant separating means 31 forms a grill with a cylindrical body 32 having an opening portion connected through with the air inlet hole 11 of the first case member 10 and a plurality of passages connected through with the air discharge hole 21 of the second case member on the outer circumference of a cylindrical body 32. The passages 33 may be formed as holes as shown in the embodiment or as slits not limiting the form and structure to what is shown in the embodiment. In addition, the cylindrical body 32 has a positioning groove 34 formed at the opposite end of the opening portion in the approximate middle of the outer surface for receiving the positioning protrusion 23 provided on the second case member 20. Such first contaminant separating member 31 is disposed in the space created in between the first and second case members 10, 20 with the opening portion closely attached to the first case member 10 and the positioning groove 23 receiving the positioning protrusion 23 of the second case member 20. The air including contaminants is flown into the first contaminant separating member 31 through the air inlet hole 11 and the opening portion of the first contaminant separating member 31 and discharged through the plurality of passages 33 formed on the side of the first contaminant separating member 31. The contaminants entrained in the flown-in air is separated and collected as they cannot pass through the passages 33 and the cleaned air is discharged through the passages and the air discharge hole 21 of the second case member 20.

The second contaminant separating member 35 is placed in the space created in between the first and second members 10, 20 while covering the outer circumference of the grill and comprised of a cylindrical fine dust filter of a porous material such as a sponge with both ends open. Accordingly, the fine contaminants discharged with air without being separated by the first contaminant separating member 31 are secondarily separated thereby cleaning the discharged air better. The second contaminant separating member 35 is disposed while an end is supported inside the first case member 10 and the other end is supported by a plurality of the supporting ribs 24 formed on the rear surface 20a of the second case member 20.

Figure 4:
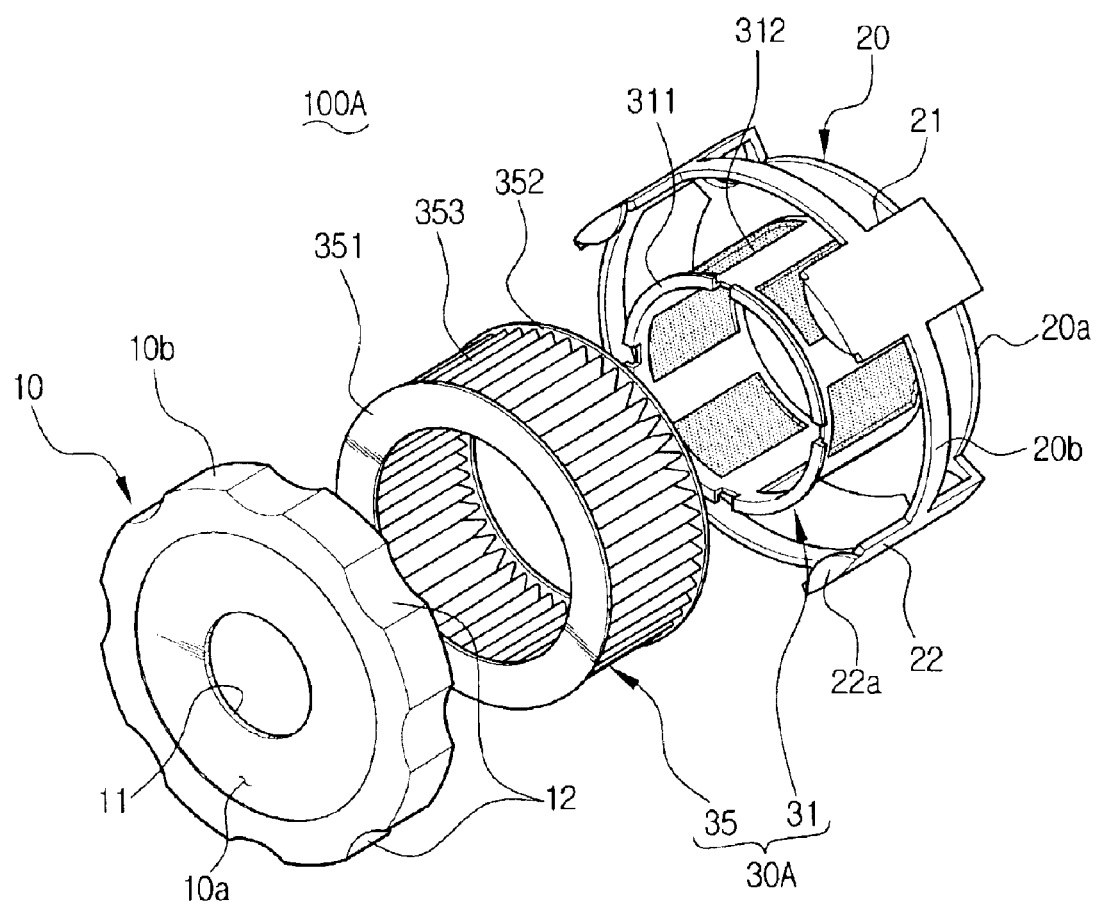
FIG. 4 is an exploded perspective view showing a dust collecting filter of a vacuum cleaner according to another embodiment of the present invention.

FIG. 4 shows a dust collecting filter of a vacuum cleaner according to another embodiment of the present invention. As shown, the basic structure of the dust collecting filter 100A according to another embodiment of the present invention comprising the first case member 10, the second case member 20 and the contaminant separating means 30A is not so much different to the basic structure of the previously described dust collecting filter. Meanwhile, the dust collecting filter 100A is distinctive in the structure of the contaminant collecting means 30A. Hereinafter, the dust collecting filter 30A which is distinctive in FIG. 4 will be intensively described while a detailed description of other structures is omitted by assigning like reference numerals to the identical elements.

As shown in FIG. 4, the contaminant separating means 30A has the same structure as the first embodiment comprising a first contaminant separating member 31 primarily separating large contaminants entrained in flown-in air and a second contaminant separating member 35 secondarily separating fine contaminants not separated by the first contaminant separating member 31 except that the first contaminant separating member 31 is integrally formed with the second case member 20.

When observed in detail, the first contaminant separating member 31 is integrally formed on the inner surface of the rear surface 20a of the second case member 20 and forms a grill with a frame 311 having a front open portion connected through with the air inlet hole 11 of the first case member 10 and a plurality of side open portions connected with the air discharge hole 21 of the second case member 20, and nets disposed on the side open portions. In addition, the second contaminant separating member 35 is formed of a fine dust filter of a non-woven fabric material around the outer circumference of the grill.

The second contaminant separating member 35 is formed of the non-woven fabric 353 between an upper and lower brackets 351, 352 and the non-woven fabric 353 has a pleated portion in order to increase the area for separating contaminants.

Hereinafter, the operation of the vacuum cleaner having the dust collecting filter according to the present invention with the structure described above will be described referring to FIGS. 5 and 6.

Figure 6:
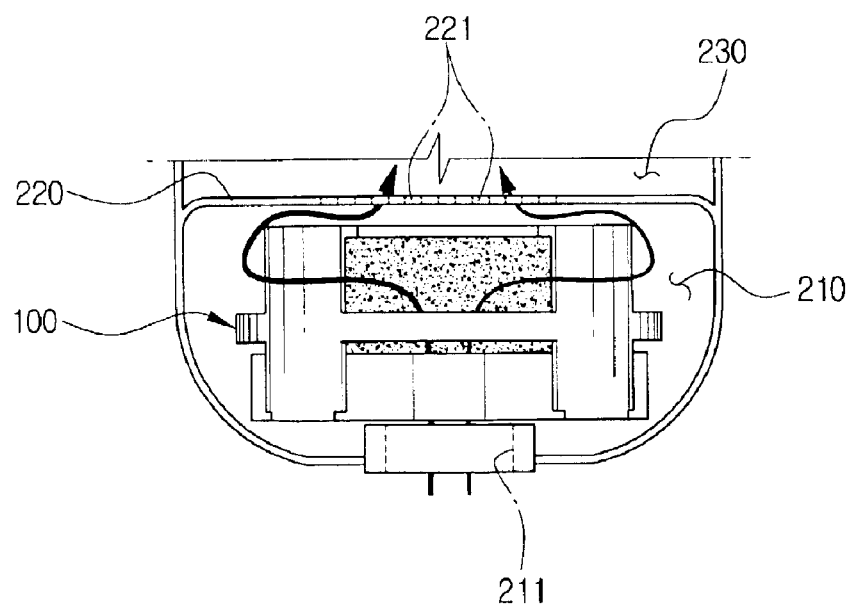
FIG. 6 is a plain view of FIG. 5.

The dust collecting filter 100 is removably disposed in the dust collecting chamber 210 of the vacuum cleaner as shown in FIGS. 5 and 6. The air inlet hole 11 of the dust collecting filter 100 is disposed to be connected through with the air inlet port 211 of the dist collecting chamber 210.

Accordingly, when the vacuum generating apparatus 300 of the driving chamber 230 is driven as the vacuum cleaner is started, the dust collecting chamber 210 has the pressure reduced and accordingly air including all kinds of contaminants is sucked into the dust collecting chamber 210 through the suction brush (not shown) from the surface to be cleaned.

The sucked-in air is flown into the dust collecting filter 100 through the air inlet port 211 of the dust collecting chamber 210 and the air inlet hole 11 of the dust collecting filter 100 and then discharged passing through the passages 33 of the first contaminant separating member 31, the second contaminant separating member 35, the air discharge hole 21 of the dust collecting filter 100, the dust collecting chamber 210, the air discharge port 221, and finally through the driving chamber.

Large contaminants entrained in the air cannot pass through the passages 33 of the first contaminant separating member 31 thereby being separated from the air and collected inside the first contamination separating member 31, and fine contaminants not separated by the first contaminant separating member 31 is secondarily separated by the second contaminant separating member 35. The air cleaned by the contaminant separation procedure is discharged outside through the above-mentioned discharge route.

Meanwhile, when the first contaminant separating member 31 is full of contaminants, the first contaminant separating member 31 is emptied by dismounting the dust collecting filter 100 of the vacuum cleaner body 200 from the dust collecting chamber 210, and then separating the first and second case members 10, 20 of the dust collecting filter 100. When the first contaminant separating member 31 is cleaned, the second contaminant separating member 35 is cleaned together. After the first and second contaminant separating members 31, 35 are cleaned and washed, they are assembled and mounted into the dust collecting chamber 210 of the vacuum cleaner body 200 for use.

According to the present invention described above, the dust collecting filter separating and collecting contaminants entrained in the drawn-in air can be reused thereby reducing vacuum cleaner maintenance costs.

Moreover, according to the present invention, the dust collecting filter has a structure that is hard for the harmful bacteria to propagate and therefore the environment can be maintained hygienic. Also, the vacuum cleaner is more convenient for use as it is easy to mount and dismount the dust collecting filter.

Therefore, according to the present invention, a vacuum cleaner which requires less maintenance costs and is hygienic, convenient and thus satisfying can be provided.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A dust collecting filter of a vacuum cleaner, which is reusable, disposed in a dust collecting chamber in which contaminants entrained in air drawn in through air suction port of the dust collecting filter are separated and collected, the dust collecting filter of a vacuum cleaner comprising:

a first case member with an air inlet hole connected through with an air inlet port of the dust collecting chamber, the first case member forming a cylinder and having a plurality of groove portions on the side;

a second case member with a plurality of air discharge holes formed on the side for forming paths for discharging air flown in through the air inlet hole, the second case member connected with the first case member to form predetermined space in between the first case member and the second case member, the second case member forming a cylinder and having a plurality of resilient plates with hooks for hooking on the groove portions wherein the first case member and the second case member are selectively separatable; and a contaminant separating device disposed on air discharge path of the predetermined space for separating and collecting contaminants from air passing the air discharge path and being discharged through the air discharge hole, wherein the contaminant separating device comprises a first contaminant separating member initially separating large contaminants and a second contaminant separating member secondarily separating fine contaminants not separated by the first contaminant separating member.

2. The dust collecting filter of a vacuum cleaner according to claim 1, wherein the first contaminant separating member forms a grill with a cylindrical body having an opening portion connected through with the air inlet hole of the first case member and a plurality of passages connected through with the air discharge hole of the second case member on the outer circumference of a cylindrical body, and the second contaminant separating member forms a fine dust filter of a sponge material located on outer circumference of the grill.

3. The dust collecting filter of a vacuum cleaner according to claim 2, wherein the second case member has a positioning protrusion formed in the approximate middle and the grill has a positioning groove formed to correspond to the positioning protrusion for receiving the positioning protrusion.

4. The dust collecting filter of a vacuum cleaner according to claim 2, wherein the second case member has a plurality of supporting ribs for supporting the fine dust filter.

5. The dust collecting filter of a vacuum cleaner according to claim 1, wherein the first contaminant separating member is integrally formed with the second case member and forms a grill with a frame having a front open portion connected through with the air inlet hole of the first case member, a plurality of side open portions connected through with the air discharge hole of the second case member, and nets disposed on the side open portions, and the second contaminant separating member is a fine dust filter of a non-woven fabric material located on outer circumference of the grill.

6. The dust collecting filter of a vacuum cleaner according to claim 5, wherein the fine dust filter has a pleated portion in order to increase the area for separating contaminants.

7. A vacuum cleaner comprising:

a vacuum cleaner body having a dust collecting chamber with an air inlet port connected with a suction brush and an air discharge port;

a vacuum generating apparatus disposed in a driving chamber spaced at the rear side of the dust collecting chamber of the vacuum cleaner body to be connected through with the dust collecting chamber via the air discharge port for reducing pressure in the dust collecting chamber; and a dust collecting filter, which is reusable, disposed in the dust collecting chamber for separating and collecting contaminants entrained in air drawn into the dust collecting chamber, wherein the dust collecting filter comprises a first case member with an air inlet hole formed to be connected through with an air inlet port of the dust collecting chamber, a second case member connected with the first case member to form predetermined space in between the first and second case member and has a plurality of air discharge holes on the side to form a path for air flown in through the air inlet hole, and a contaminant separating device disposed in the air path in the predetermined space for separating and collecting contaminants from air being discharged through the plurality of air discharge holes.

8. The vacuum cleaner according to claim 7, wherein the first case member forms a cylinder and has a plurality of groove portions on the side, and the second case member forms a cylinder and has a plurality of resilient plates with hooks for hooking on the groove portions whereby the first case member and the second case member are selectively separatable.

9. The vacuum cleaner according to claim 8, wherein the contaminant separating device comprises:

a first contaminant separating member for initially separating large contaminants; and a second contaminant separating member for secondarily separating fine contaminants not separated by the first contaminant separating member.

10. The vacuum cleaner according to claim 9, wherein the first contaminant separating member forms a grill with a cylindrical body having an opening portion connected through with the air inlet hole of the first case member and a plurality of passages connected through with the air discharge hole of the second case member on the outer circumference of a cylindrical body, and the second contaminant separating member forms a fine dust filter of a sponge material located on outer circumference of the grill.

11. The vacuum cleaner according to claim 10, wherein the second case member has a positioning protrusion formed in the approximate middle and the grill has a positioning groove formed to correspond to the positioning protrusion for receiving the positioning protrusion.

12. The vacuum cleaner according to claim 10, wherein the second case member has a plurality of supporting ribs for supporting the fine dust filter.

13. The vacuum cleaner according to claim 9, wherein the first contaminant separating member is integrally formed with the second case member and forms a grill with a frame having a front open portion connected through with the air inlet hole of the first case member, a plurality of side open portions connected through with the air discharge hole of the second case member, and nets disposed on the side open portions, and the second contaminant separating member is a fine dust filter of a non-woven fabric material located on outer circumference of the grill.

14. The vacuum cleaner according to claim 13, wherein the fine dust filter has a pleated portion in order to increase the area for separating contaminants.

* * * * *